United States Patent Office 3,631,009
Patented Dec. 28, 1971

3,631,009
POLYMERIZATION INITIATOR ACTIVATOR SALTS
Glen E. Meyer, Kent, Ohio, assignor to The Goodyear Tire & Rubber Company, Akron, Ohio
No Drawing. Continuation of abandoned application Ser. No. 697,600, Jan. 15, 1968. This application Feb. 24, 1970, Ser. No. 14,749
Int. Cl. C08d 1/00, 1/12, 1/20
U.S. Cl. 260—82.3    8 Claims

ABSTRACT OF THE DISCLOSURE

Discloses the use of initiator activators in the polymerization of an ethylenically unsaturated monomer capable of being polymerized by hydrogen peroxide and organic hydroperoxide catalysts in a mutual solvent polymerization system, mutual solvents being lower alcohols, acetone, methyl ethyl ketone, dioxane and tetrahydrofuran, the initiator activators being soluble in the non-aqueous mutual solvent by at least 2% and being a chloride, bromide, nitrate, thiocyanate or sulfate salt of magnesium, lithium, calcium, zinc, potassium, strontium, ammonia, quaternary ammonia, and hydrochloric and hydrobromic acid salts of primary, secondary and tertiary amines.

---

This application is a streamlined continuation application of application Ser. No. 697,600, filed Jan. 15, 1968, now abandoned.

This invention is directed to a process for the polymerization of certain ethylenically unsaturated monomers in a mutual solvent polymerization system using certain peroxide catalysts, which process is improved in the use of certain salts of certain acids having an activating effect on the polymerization system.

An object of this invention is to increase the rate at which polymer is produced in a mutual solvent system.

Another object is to increase the rate of conversion when hydrogen peroxide and lower molecular weight organic hydroperoxides are used as initiators in mutual solvent polymerization systems at temperatures below about 100° C.

Still another object of this invention is to increase the rate at which hydrogen peroxide and lower molecular weight organic hydroperoxides are decomposed in mutual solvent systems to increase the rate of polymer production at low temperatures.

Heretofore it has been difficult to obtain a satisfactory yield of polymer within a satisfactory time. This problem of time has been solved in the past by increasing the temperature at which the polymerization was carried out. However, in order to get satisfactory yields, temperatures as high as 150° C. were required. Certain ethylenically unsaturated monomers which polymerize at temperatures as high as 150° C. with hydrogen peroxide as the initiator may not be polymerized in conventional equipment used in the manufacture of the synthetic rubber known as SBR but require the use of high pressure stainless steel equipment. Solving the problem by increasing the temperature results in a less economical process and at the same time a more dangerous one in view of the high pressures required.

Also, when monomer soluble organic peroxides and oragnic hydroperoxides are used as catalysts for the bulk polymerization of ethylenically unsaturated monomers, discoloration of the polymer product often occurs when the polymerization is carried out at temperatures above, for example, 100° C. Other difficulties occur at these elevated temperatures including control of the rate of polymerization and the tendency to produce premature gelling in the reactor, especially when diene polymers are being formed.

In the preparation of homopolymers and copolymers of monomeric compounds containing the $CH_2=C<$ group, using the lower molecular weight polar organic compounds as mutual solvents so that a homogeneous polymerization mixture will be formed, a group of salts, formerly believed to be inert, have been found to cause an unexpected increased in the rate of polymer formation. Though the exact mechanism by which these salts cause this very desirable result is not known, analytical data show that these salts do increase the rate at which hydrogen peroxide and lower molecular weight organic hydroperoxides decompose in a mutual solvent polymerization system. The reactive fragments from this decomposition are useful in the initiation of polymerizations resulting in homopolymers, copolymers, and/or graft polymers depending on the materials included in the system.

It has now been discovered that certain activator salts will cause a 2 to over a 10 fold increase in the rate of polymer formation. These salts perform this function in a mutual solvent polymerization system when these salts are at least about 2% soluble in the non-aqueous mutual solvent at 25° C. and when added in an appropriate amount. In some cases, these salts even cause polymerization to take place where, in the absence of the activator salt, no significant polymerization would occur.

These activator salts can be defined as the soluble, at least about 2% in the non-aqueous mutual solvent at 25° C., chloride, bromide, nitrate, thiocyanate, and sulfate salts of lithium, sodium, potassium, magnesium, zinc, calcium and strontium, as well as the chloride, bromide and thiocyanate salts of ammonium and quaternary ammonium, and the hydrochloric and hydrobromic acid salts of primary, secondary, and tertiary amines. Ammonium salts, quaternary ammonium salts and acid salts of primary, secondary and tertiary amines conforming to the following generalized structural formula:

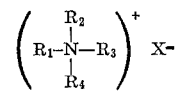

wherein N is a pentavalent nitrogen atom; X is selected from the group consisting of the chloride, bromide and thiocyanate anions; $R_1$, $R_2$, $R_3$ and $R_4$ are selected from the group consisting of hydrogen, alkyl radicals having from 1 to 18 carbon atoms, cycloalkyl radicals having from 5 to 10 carbon atoms, aralkyl radicals having from 7 to 10 carbon atoms, and wherein $R_1$ and $R_2$ are alkylene radicals having from 4 to 9 carbon atoms and are combined to form a heterocyclic ring with the nitrogen and wherein $R_1$, $R_2$ and $R_3$ are alkenylene radicals having from 5 to 10 carbon atoms and are combined to form a heterocyclic aromatic ring with the nitrogen.

Examples of useful ammonium salts are ammonium chloride, ammonium bromide and ammonium thiocyanate.

Examples of useful quaternary ammonium salts are tetramethyl ammonium chloride, tetraethyl ammonium chloride, tetraethyl ammonium bromide, tetramethyl ammonium thiocyanate, dimethyldiethyl ammonium chloride, tetrabutyl ammonium chloride, tetrabutyl ammonium bromide, tetrapentyl ammonium chloride, cetyldimethylbenzyl ammonium chloride and lauryl pyridinium chloride.

A few of the many possible examples of useful acid salts of primary, secondary and tertiary amines are methylamine hydrochloride, trimethylamine hydrochloride, ethylamine hydrochloride, diethylamine hydrochloride, diethylamine hydrobromide, triethylamine hydrochloride, benzylamine hydrochloride, tribenzylamine hydrochloride, n-butylamine hydrobromide, di-n-butylamine hydrochloride, piperidine hydrochloride, pyrolidine hydrochloride, pyridine hydrochloride, pyridine hydrobromide, 3-picoline hydrochloride, 2-methyl-5-vinyl pyridine hydrochloride, and 2-vinyl pyridine hydrochloride.

Examples of particularly useful activator salts are lithium chloride, lithium bromide, magnesium chloride, magnesium sulfate, zinc chloride, sodium thiocyanate, potassium thiocyanate, zinc nitrate, calcium nitrate and strontium chloride; lithium chloride being the most preferred. Since minimum water content is advantageous in the polymerization mixture, the anhydrous forms of these salts are preferred; however, the hydrated forms may often be used more conveniently. The amount of activator salt required to provide a significant increase in the rate of polymer formation depends on the various ingredients in the mutual solvent polymerization system, but the useful level is generally in the range of from 0.001 to about 10 parts per 100 parts, by weight, of polymerizable monomers. In most instances, the amount of mutual solvent charged is in the range of 20 to 50 parts by weight per hundred parts by weight of monomeric material, and under these conditions the optimum amount of activator salts is normally in the range of 0.005 to 5.0 parts per 100 parts of monomer. Certain of the salts, such as lithium chloride, ammonium chloride, and tetramethyl ammonium chloride are generally most effective in the range of 0.01 to 0.2 part while the more soluble salts, such as zinc chloride, calcium nitrate, and magnesium chloride usually provide their best performance in the higher range of about 0.1 to 1.0 part. The high molecular weight quaternary ammonia salts, such as lauryl pyridinium chloride, and the hydrochloric and hydrobromic acid salts of high molecular weight amines, such as tribenzyl amine, generally work best at even higher levels such as in the range of 0.3 to 3 parts. These latter materials are not readily separated from the polymer and do tend to stabilize emulsions that might be formed if a water washing step is included in the polymer recovery process. Where high levels of solvents are used considerably higher levels of the activator salts are often found useful.

Various solvents are useful in this type of polymerization system. First is the non-aqueous mutual solvent which provides the means for forming a homogeneous solution of otherwise incompatible ingredients. The useful non-aqueous mutual solvents for the present process include those which form single phase systems in all proportions, both with aqueous hydrogen peroxide and with the monomeric material concerned and in which the desired activator salt is soluble to the extent of at least about 2%. Such solvents include those alcohols, ketones, ethers, alcohol-ketones, alcohol-ethers and alcohol-esters which are miscible with water in all proportions and which do not contain polymerizable carbon to carbon unsaturation. Examples of such solvents include methanol, ethanol, n-propanol, isopropanol, acetone, β-(methoxy) ethanol and dioxane. Other solvents which may be used include solvents which are miscible with water only in limited proportions, but sufficiently so as to produce a single liquid phase with the reactants in question. Such solvents include, for example, the normal, secondary, and tertiary butanols, methyl ethyl ketone, and tetrahydrofuran. The mutual solvent may also comprise a mixture of two or more solvents, one of which may per se not dissolve one of the reactants. Thus, azeotropic mixtures of various solvents may be used, such as mixtures of a hydrocarbon diluent, for example, toluene and a $C_1$ to $C_4$ alcohol such as isopropanol; and mixtures of an alcohol and a ketone, for example, methanol and methyl ethyl ketone. The preferred mutual solvents are methanol, ethanol, n- and isopropanol and tetrahydrofuran. These solvents are not equivalent to each other because of the difference in solubility of the activator salts in the various mutual solvents. Ammonium chloride, for example, may be used with methanol or with mixtures of methanol and isopranol containing about 50% or more methanol; but ammonium chloride is too insoluble to use with isopranol alone.

The mutual solvents mentioned above are normally ued in the range of 10 to 400 parts preferably 15 to 60 parts per 100 parts of monomeric material. In those instances where the polymer is soluble in the monomeric material but insoluble in the mutual solvent, the mutual solvent level should be kept to a minimum. At high levels of mutual solvent, the polymer, highly swollen with monomer, will be forced out of solution forming a two-phase system after which the polymerization will normally not be satisfactory. In those instances where the polymer is insoluble in the residual mixture of mutual solvent and monomeric material, separation of the polymer has little effect on further polymerization of the monomer. Another group of solvents which can serve the dual purpose of mutual solvent and solvent for some polymers includes, for example, dimethylsulfoxide, ethylene carbonate, propylene carbonate, tetrahydrofuran and dimethylformamide. With the appropriate monomeric material, these solvents are especially useful for polymers such as polyacrylonitrile, polymethacrylonitrile, polyvinyl chloride and polyvinylidene chloride, where it is desirable to prepare these polymers and have them remain in solution for further processing.

Other solvents such as benzene, toluene, heptane, etc., are often useful in the preparation of polymers soluble in these solvents, to lower the vapor pressure of the polymerization system when highly volatile monomers such as butadiene make up a considerable proportion of monomeric materials. Also, these same solvents aid in maintaining a more fluid mixture during the polymerization process at high levels of conversion and during those stages of the processing where fluidity is important particularly while washing the product with water to remove water soluble materials such as residual peroxide and activator salts. Some polymers such as polystyrene, polyvinylpyridine and copolymers containing a high proportion of these monomers are solids or semi-solids at normal polymerization and processing temperatures. The addition of appropriate amounts of solvents such as benzene, toluene, and methyl ethyl ketone to the polymerization recipe aids in maintaining a fluid system through those steps of the processing where fluidity is desired. These solvents change the solubility of hydrogen peroxide and activator salts in the polymerization system, so appropriate adjustments may be required in both the choice of mutual solvent and activator salt, and the amounts of each to be used for optimum results.

Solvents in which both monomeric material and corresponding polymer are soluble are also helpful in controlling the molecular weight of the polymer. Generally, the higher the level of this type of solvent in the recipe, the lower will be the molecular weight of the resultant polymer.

The products of the process of this invention are produced when in addition to the conditions recited above, the catalyst is either hydrogen peroxide or low molecular weight organic hydroperoxide.

When aqueous hydrogen peroxide is used, the higher concentrations are preferred so that less water will be introduced into the polymerization system. Commercial, epoxidation grade, 70% hydrogen peroxide has been found very suitable. This is normally diluted to a level of about 10% hydrogen peroxide by adding it slowly, and with agitation, to the proper amount of mutual solvent. With normal precautions and care to prevent contamination by active materials such as iron and strong alkalies, a 10% solution so prepared appears to be quite stable and is readily used in the preparation of the polymerization mixture. In some instances, it is more convenient to charge the 70% hydrogen peroxide directly to the reactor; and in other instances, solutions containing less than 10% hydrogen peroxide may be preferred. Lower concentrations of aqueous hydrogen peroxide, such as the commercially available 30% and 50% grades may also be used. The additional water in these solutions generally requires the use of higher levels of mutual solvent so that homogeneous solutions can be obtained for the polymerization mixture. Examples of lower molecular weight organic hydroperoxides that are useful in the practice of this invention include 2,5-dimethylhexane-2,5-dihydroperoxide, t-butylhydroperoxide, paramenthane hydroperoxide, diisopropyl benzene hydroperoxide, 2-propylidene hydroxy hydroperoxide, and 2-butylidenehydroxy hydroperoxide.

Between 0.1 and about 10 parts of hydrogen peroxide and organic hydroperoxides may be used per 100 parts of monomer.

Examples of monomers that are useful in the practice of this invention are conjugated diene monomers such as butadiene-1,3; 2-chlorobutadiene-1,3; isoprene, piperylene and hexadienes; vinyl monomers such as styrene, $\alpha$-methylstyrene, divinyl benzene, vinyl chloride, vinyl acetate, vinylidene chloride, methylmethacrylate, ethylacrylate, vinylpyridine, acrylonitrile, methacrylonitrile and methacrylic acid. The monomers may be used singly or in admixture. Copolymers may be obtained from mixtures of those monomers that are known to copolymerize in free-radical initiated polymerization system. When hydrogen peroxide is used, the process of the present invention is particularly applicable to the production of hydroxyl terminated, low molecular weight diene polymers and copolymers. These polymers may vary in physical appearance from liquids to brittle solids at 25° C. depending on polymer composition and molecular weight.

Hydrogen peroxide is the preferred initiator. Since both this initiator and many of the activator salts are soluble in the monomeric material only in the presence of an appropriate non-aqueous mutual solvent, consideration is to be given to the selection of the solvent when maximum performance is desired.

Consideration is also to be given to the changing composition of the mixture as polymerization progresses. Some of the polymers have low solubility in certain mutual solvents; therefore, various combinations of ingredients which are very useful at low levels of conversion may become unsatisfactory at high levels. Methanol, for example, is a desirable mutual solvent because of its low cost and the ease with which it may be removed from the final product. Methanol is also desirable because the very active, low cost, activator salts, such as ammonium chloride, may be used with it to obtain high rates of polymerization. At low conversion levels, between about 10% to about 30%, the polymers, such as polybutadiene and polyisoprene, swollen with monomer, generally start to form a separate phase, and the system becomes heterogeneous. If polymerization continues, it will generally be at a low rate and with the formation of undesirable polymer. The use of an admixture of other mutual solvents such as isopropanol and methyl ethyl ketone affords some improvement in the system. On the other hand, the use of isopropanol as the mutual solvent with lithium chloride as the activator salt provides a system that is useful up to much higher levels of conversion before heterogeneity develops.

The organic hydroperoxides are generally soluble in the monomers for which this invention is applicable; therefore, choice of mutual solvent is dictated mainly by the activator salt to be used and the polymer solubility as discussed above.

The term "mutual solvent polymerization system" as used herein refers to a solution comprising the monomeric material to be polymerized and one or more non-aqueous solvent type materials, serving as a mutual solvent for the monomers as well as the initiator and initiator activator so that a homogeneous polymerization medium is obtained. For example, neither water nor hydrogen peroxide is significantly soluble in the monomer isoprene; however, to a mixture of 100 parts by weight of isoprene and 30 parts of isopropanol over 5 parts of 70% hydrogen peroxide and 0.1 part lithium chloride can be added and a homogeneous solution obtained. Since the various ingredients are individually quite soluble in isopropanol, the latter serves as a mutual solvent for the otherwise incompatible ingredients.

Polymers covering a wide range of molecular weights, corresponding to a wide range of viscosities for the liquid polymers and a range of softening points for the solid polymers, may be prepared by this process. In general, the higher the amount of hydrogen peroxide and organic hydroperoxides charged, the lower will be the molecular weight of the resultant polymer. Modifiers and chain transfer agents may be included in the polymerization recipe to alter the composition of the polymer and/or to provide additional control of the molecular weight of the polymer. Other factors also affect the molecular weight of the polymer, such as conversion, the proportion of solvent in the mixture and particularly the efficiency with which polymer molecules are initiated by reactive fragments resulting from the decomposition of the peroxides. This efficiency may generally be enhanced by adding the peroxide either increment-wise or continuously during the polymerization. A convenient procedure is to add the peroxide as a 10% solution in the mutual solvent. Other ingredients such as fillers, stabilizers, antioxidants, plasticizers, etc. may also be added during the polymerization reaction and the polymerization may be carried out by a continuous process.

The examples in Tables I through IX are illustrative of the invention.

For the examples in Table I a dilute solution of hydrogen peroxide (10% $H_2O_2$ by wt.) was prepared by adding slowly and with agitation, 14.3 grams of commercial, epoxidation grade, 70% hydrogen peroxide to 85.7 grams of isopropanol for each 100 grams of solution. The same process of dilution was repeated but using methyl ethyl ketone (MEK).

Polymerization grade isoprene was freed of inhibitor by washing in sequence with 5% caustic, distilled water, 0.1% hydrochloric acid and finally distilled water, then dried over anhydrous sodium sulfate.

Separate solutions of lithium chloride, ammonium thiocyanate, and dibutylamine were made by dissolving them in the mutual solvent indicated. Polymerization mixtures were prepared in 4-ounce reactor bottles equipped with Teflon lined, screw caps by charging the weights of materials listed in Table I for each of the examples indicated. The bottles were then sealed, placed on a wheel in a water bath and tumbled at the temperatures and for the periods of time shown. Conversions were calculated from the percent of non-volatile material determined by heating a weighted aliquot of the mixture in a tarred aluminum dish on a hotplate at low heat until the weight became constant. Residual hydrogen peroxide was determined by a slight modification of the routine potassium iodide-sodium thiosulfate titration procedure. A weighed aliquot (about 5 grams) of the polymerization mixture was placed in a 200 ml. separatory funnel. To this was added 20 ml. toluene and 10 ml. distilled water. After shaking the mixture thoroughly and allowing about 5 to 10 minutes for phase separation to occur, the water layer was removed and saved. The toluene solution was washed twice more with 10 ml. portions of water. The washings, containing the peroxide, were combined and heated to 50° to 60° C. for about 5 minutes to volatilize out any dissolved monomer. Approximately 0.5 gram crystalline potassium iodide and 1 ml. 10% sulfuric acid were added and washings titrated with 0.1 $Na_2S_2O_3$ by routine analytical procedure.

TABLE II

Ingredients: Each charge contained 20 grams of butadiene-1,3 and 1.5 grams 10% hydrogen peroxide in isopropanol and the activator lithium chloride

| Example | 0.2% LiCl, g. | Isopropanol, g. | Toluene, g. | 17 hrs., 65° C., percent conversion |
|---|---|---|---|---|
| 13 | None (control) | 5.7 | None | [1] 1.1 |
| 14 | do | 5.7 | None | [1] 1.2 |
| 15 | 1.0 | 4.7 | None | [1] 11.5 |
| 16 | 2.0 | 3.7 | None | [1] 12.5 |
| 17 | None (control) | 5.7 | 6.7 | 2.5 |
| 18 | 0.2 | 5.7 | 6.7 | 9.7 |
| 19 | 0.5 | 5.2 | 6.7 | 10.4 |
| 20 | None (control) | 3.7 | 6.7 | 2.6 |
| 21 | 0.2 | 3.2 | 6.7 | 9.0 |
| 22 | None (control) | 3.7 | 13.4 | 2.7 |
| 23 | 0.2 | 3.5 | 13.4 | 7.5 |
| 24 | 0.5 | 3.2 | 13.4 | 9.7 |
| 25 | 1.0 | 2.7 | 13.4 | 12.0 |

[1] Runs 13 through 16 were for 15.5 hours at 60° C.

TABLE I

Ingredients: Each charge contained 20 grams of isoprene, 1.5 grams of 10% hydrogen peroxide in the solvent indicated, and the activator salt shown

| Example | Activator | Amt., g. | Solvent | Amt., g. | Time, hrs. | Temp., °C | Percent conversion | Residual $H_2O_2$ [1] percent |
|---|---|---|---|---|---|---|---|---|
| 1 | None (C) | | $iC_3H_7OH$ | 5.7 | 6.5 | 70 | 2.4 | 92 |
| 2 | 0.2% LiCl | 0.25 | $iC_3H_7OH$ | 5.45 | 6.5 | 70 | 7.5 | 65 |
| 3 | 0.2% LiCl | 0.5 | $iC_3H_7OH$ | 5.2 | 6.5 | 70 | 9.8 | 49 |
| 4 | 0.2% LiCl | 1.0 | $iC_3H_7OH$ | 4.7 | 6.5 | 70 | 11.4 | 30 |
| 5 | None (C) | | $iC_3H_7OH$ | 8.5 | 72 | 25 | 0.1 | 100 |
| 6 | 2% LiCl | 1.0 | $iC_3H_7OH$ | 7.5 | 72 | 25 | 6.8 | 23 |
| 7 | 2% LiCl | 2.0 | $iC_3H_7OH$ | 6.5 | 72 | 25 | 7.2 | 19 |
| 8 | None (C) | | MEK | 6.7 | 18 | 71 | 6.4 | 82 |
| 9 | 1% $NH_4SCN$ | 1 | MEK | 5.7 | 18 | 71 | 12.7 | 30 |
| 9a | None (C) | | MEK | 8.0 | 16 | 70 | 11.4 | 95 |
| 9b | 1% $NH_4SCN$ | 1 | MEK | 7.0 | 16 | 70 | 21.9 | 51 |
| 10 | None (C) | | $iC_3H_7OH$ | 6.7 | 18 | 71 | 6.1 | 82 |
| 11 | 2% $(C_4H_9)_2NH$ | 3 (C) | $iC_3H_7OH$ | 3.7 | 18 | 71 | 4.0 | 65 |
| 12 | 2% $(C_4H_9)_2NH$ | 6.7 (C) | $iC_3H_7OH$ | | 18 | 71 | 2.7 | 51 |

[1] Residual $H_2O_2$ equals percent of that originally charged.

NOTE.—(C) is Control; 9a and 9b were charged with 5 g. acrylonitrile and 15 g. butadiene in place of isoprene.

These results show that activator salts of the type used in this invention cause an increase in the rate of decomposition of hydrogen peroxide with concomitant increase in polymer formation while dibutylamine used in Examples 11 and 12, even though causing an increase in the rate of decomposition of the peroxide, did not cause a concomitant increase but rather a decrease in the rate of polymer formation.

The technique described above for the preparation of polymers was also used for the preparation of the polymers of butadiene in the examples in Table II. These examples include toluene as a solvent for the polymer in addition to the use of isopropanol as the mutual solvent.

The technique described for Table I was used to evaluate various quaternary ammonium salts as activators for hydrogen peroxide in the mutual solvent system used for the polymeriaztion of isoprene. The results are listed below in Table III.

TABLE III

Ingredients: Each charge contained 20 grams of isoprene, 0.5 gram 30% hydrogen peroxide and activators in the corresponding solvent as shown

| Example | Activator | Amt., g. | Solvent | Amt., g. | Time, hrs. | Temp. °C | Percent conv. |
|---|---|---|---|---|---|---|---|
| 26 | None (control) | | $CH_3OH$ | 10 | 65 | 49 | 3.0 |
| 27 | $(CH_3)_4NCl$ (2%) | 2.5 | $CH_3OH$ | 7.5 | 65 | 49 | 10.0 |
| 28 | $(CH_3)_4NCl$ (2%) | 5.0 | $CH_3OH$ | 5.0 | 65 | 49 | 14.6 |
| 29 | None (control) | | $iC_3H_7OH$ | 8 | 19 | 70 | 7.0 |
| 30 | LPC [1] (2%) | 5.0 | $iC_3H_7OH$ | 3 | 19 | 70 | 22.8 |
| 31 | $(C_2H_5)_4NCl$ (2%) | 5.0 | $iC_3H_7OH$ | 3 | 19 | 70 | 20.9 |
| 32 | $(nC_4H_9)_4NCl$ (2%) | 5.0 | $iC_3H_7OH$ | 3 | 19 | 70 | 21.0 |
| 33 | $(nC_4H_9)_4NBr$ (2%) | 5.0 | $iC_3H_7OH$ | 3 | 19 | 70 | 21.5 |
| 34 | $(nC_5H_{11})_4NCl$ (2%) | 5.0 | $iC_3H_7OH$ | 3 | 19 | 70 | 15.1 |

[1] Here and hereafter LPC=lauryl pyridinium chloride.

The technique described for Table I was used for evaluating the hydrochloric acid salts of various amines, the results being reported in Table IV below. Solutions (2%) of the salts were prepared by neutralizing 5% solutions of the amines in methanol with dilute methanolic hydrochloric acid and diluting the neutralized solution with methanol to 2%.

TABLE IV

| Ex. | Activator | Amt., g. | CH₃OH, g. | 10% H₂O₂, g. | Isoprene, g. | 16.5 hrs., 70° C., percent conversion |
|---|---|---|---|---|---|---|
| 35 | None (control) | | | 2.5 | 1.5 | 20 | 7.6 |
| 36 | CH₃NH₃Cl (2%) | 0.3 | 2.2 | 1.5 | 20 | 17.9 |
| 37 | CH₃NH₃Cl (2%) | 2.5 | | 1.5 | 20 | 21.5 |
| 38 | (C₂H₅)₂NH₂Cl (2%) | 0.3 | 2.2 | 1.5 | 20 | 18.4 |
| 39 | (C₂H₅)₂NH₂Cl (2%) | 2.5 | | 1.5 | 20 | 23.6 |
| 40 | (C₂H₅)₃NHCl (2%) | 0.3 | 2.2 | 1.5 | 20 | 13.6 |
| 41 | (C₂H₅)₃NHCl (2%) | 2.5 | | 1.5 | 20 | 19.2 |
| 42 | (nC₄H₉)₂NH₂Cl (2%) | 0.3 | 2.2 | 1.5 | 20 | 15.6 |
| 43 | (nC₄H₉)₂NH₂Cl (2%) | 2.5 | | 1.5 | 20 | 22.8 |
| 44 | C₆H₅CH₂NH₃Cl (2%) | 0.3 | 2.2 | 1.5 | 20 | 17.2 |
| 45 | C₆H₅CH₂NH₃Cl (2%) | 2.5 | | 1.5 | 20 | 20.8 |

The technique described in the previous table was used for evaluating the various salts as reported in Table V.

The examples listed in Table VI further illustrate the practice of this invention with other solvents and other salt activator combinations following the same technique used in Table I.

TABLE V

Ingredients: Each charge contained 20 grams of isoprene in addition to the other materials listed

| Ex. | Activator | Amt., g. | Solvent | Amt., g. | 10% H₂O₂ | Time, hrs. | Temp., °C. | Percent conv. |
|---|---|---|---|---|---|---|---|---|
| 46 | None (control) | | CH₃OH | 4.0 | 2.0 | 17 | 72 | 9.6 |
| 47 | NH₄Cl (2%) | 0.3 | CH₃OH | 3.7 | 2.0 | 17 | 72 | 22.6 |
| 48 | NH₄Cl (2%) | 0.75 | CH₃OH | 3.25 | 2.0 | 17 | 72 | 18.4 |
| 49 | None (control) | | CH₃OH | 2.5 | 1.5 | 17 | 70 | 7.6 |
| 50 | LiCl (2%) | 1.5 | CH₃OH | 1.0 | 1.5 | 17 | 70 | 13.9 |
| 51 | LiCl (2%) | 2.5 | CH₃OH | | 1.5 | 17 | 70 | 21.4 |
| 52 | MgCl₂ᵃ (2%) | 0.3 | CH₃OH | 2.2 | 1.5 | 17 | 70 | 19.2 |
| 53 | MgCl₂ᵃ (2%) | 2.5 | CH₃OH | | 1.5 | 17 | 70 | 18.2 |
| 54 | NaBr (2%) | 0.3 | CH₃OH | 2.2 | 1.5 | 17 | 70 | 10.5 |
| 55 | NaBr (2%) | 2.5 | CH₃OH | | 1.5 | 17 | 70 | 13.0 |
| 56 | None (control) | | CH₃OH | 6.5 | 1.5 | 16 | 70 | 5.0 |
| 57 | SrCl₂ᵃ (2%) | 1 | CH₃OH | 5.5 | 1.5 | 16 | 70 | 16.9 |
| 58 | SrCl₂ᵃ (2%) | 3 | CH₃OH | 3.5 | 1.5 | 16 | 70 | 19.0 |
| 59 | None (control) | | iC₃H₇OH | 10.0 | 1.5 | 16.5 | 72 | 5.8 |
| 60 | Ca(NO₂)₃ᵃ (2%) | 2.0 | iC₃H₇OH | 8 | 1.5 | 16.5 | 72 | 10.1 |
| 61 | Ca(NO₃)₂ᵃ (2%) | 7.0 | iC₃H₇OH | 3 | 1.5 | 16.5 | 72 | 13.3 |
| 62 | ZnCl₂ (10%) | 3.0 | iC₃H₇OH | 7 | 1.5 | 16.5 | 72 | 9.7 |
| 63 | ZnCl₂ (10%) | 10.0 | iC₃H₇OH | | 1.5 | 16.5 | 72 | 13.5 |
| 64 | None (control) | | Acetone | 5.5 | 1.5 | 18 | 60 | 2.0 |
| 65 | NaSCN (2%) | 1.5 | do | 4.0 | 1.5 | 18 | 60 | 5.6 |
| 66 | KSCN (2%) | 1.5 | do | 4.0 | 1.5 | 18 | 60 | 5.6 |
| 67 | None (control) | | MEK | 5.5 | 1.5 | 16 | 68 | 5.4 |
| 68 | NaSCN (2%) | 1.5 | MEK | 4.0 | 1.5 | 16 | 68 | 11.4 |
| 69 | KSCN (2%) | 1.5 | MEK | 4.0 | 1.5 | 16 | 68 | 11.4 |
| 70 | Mg(ClO₄)₂ | 1.5 | MEK | 4.0 | 1.5 | 16 | 68 | 9.7 |
| 71 | None (control) | | THF ᵇ | 6.5 | 1.5 | 16 | 50 | 0.8 |
| 72 | LiCl (1%) | 0.5 | THF ᵇ | 6.0 | 1.5 | 16 | 50 | 2.1 |
| 73 | LiCl (1%) | 1.0 | THF ᵇ | 5.5 | 1.5 | 16 | 50 | 2.2 |

ᵃ The values listed are based on anhydrous salt but using MgCl₂·6H₂O, SrCl₂·6H₂O and Ca(NO₃)₂·4H₂O.
ᵇ THF = tetrahydrofuran.

TABLE VI

| Example | Activator | Amt., g. | Solvent | Amt., g. | Monomer | Amt., g. | 30% H₂O₂ | Time, hrs. | Temp., °C. | Percent conv. |
|---|---|---|---|---|---|---|---|---|---|---|
| 74 | None (control) | | iC₃H₇OH | 15 | Isoprene | 40 | 1.0 | 20 | 62 | 6.4 |
| 75 | LPC (2%) | 2.5 | iC₃H₇OH | 12.5 | do | 40 | 1.0 | 20 | 62 | 14.8 |
| 76 | None (control) | | CH₃OH | 20 | do | 40 | 0.5 | 20 | 62 | 4.8 |
| 77 | LPC (2%) | 5 | CH₃OH | 15 | do | 40 | 0.5 | 20 | 62 | 14.2 |
| 78 | None (control) | | C₂H₅OH | 20 | do | 40 | 0.5 | 20 | 62 | 4.4 |
| 79 | LPC (2%) | 5 | C₂H₅OH | 15 | do | 40 | 0.5 | 20 | 62 | 13.3 |
| 80 | None (control) | | MEK | 20 | do | 40 | 0.5 | 20 | 62 | 5.0 |
| 81 | LPC (2%) | 5 | MEK | 15 | do | 40 | 0.5 | 20 | 62 | 16.2 |
| 82 | None (control) | | iC₃H₇OH | 100 | Styrene | 100 | 6.0 | 46 | 55 | 15 |
| 83 | AMT ¹ | 2 | iC₃H₇OH | 100 | do | 100 | 6.0 | 46 | 55 | 90 |
| 84 | None | | tC₄H₉OH | 4.0 | do | 20 | ² 3.5 | 17.5 | 70 | 10.2 |
| 85 | (nC₄H₉)₄NCl (2%) | 3.6 | tC₄H₉OH | 0.4 | do | 20 | ² 3.5 | 17.5 | 70 | 20.9 |

¹ AMT = 25% aqueous solution of cetyl dimethyl benzyl ammonium chloride, used as received.
² 10% H₂O₂.

The technique described for Table I was used for evaluating the preparation of the various copolymer identified in Table VII below:

The technique described for Table I was used to evaluate the effect of activator salts on low molecular weight organic hydroperoxides. The hydroperoxides were commercial materials and used as received. The tertiary butyl hydroperoxide (TBHP) was 70% while the paramenthane hydroperoxide (PMHP) and diisopropylbenzene hydroperoxide (DIP) were 50%.

TABLE VII

| Example | Activator | Amt., g. | Solvent | Amt., g. | Monomer[1] | Amt., g. | 30% $H_2O_2$, g. | Time, hrs. | Temp., °C. | Percent conv. |
|---|---|---|---|---|---|---|---|---|---|---|
| 86 | None (control) | | $iC_3H_7OH$ | 15 | Sty / Isop | 10 / 30 | 2.7 | 16 | 70 | 11.0 |
| 87 | LPC (2%) | 2.5 | $iC_3H_7OH$ | 12.5 | Sty / Isop | 10 / 30 | 2.7 | 16 | 70 | 33.5 |
| 88 | None (control) | | $iC_3H_7OH$ | 15 | AN / Isop | 10 / 30 | 2.7 | 16 | 51 | 14.6 |
| 89 | LPC (2%) | 5 | $iC_3H_7OH$ | 10 | AN / Isop | 10 / 30 | 2.7 | 16 | 51 | 43.7 |
| 90 | None (control) | | $iC_3H_7OH$ | 15 | MAA / Isop | 5 / 35 | 2.7 | 16 | 51 | 5.9 |
| 91 | LPC (2%) | 5 | $iC_3H_7OH$ | 10 | MAA / Isop | 5 / 35 | 2.7 | 16 | 51 | 12.3 |
| 92 | None (control) | | $CH_3OH$ | 2.5 | Sty / VP / Isop | 3 / 3 / 14 | a 1.5 | 17 | 71 | 11.3 |
| 93 | LiCl (1%) | 2.0 | $CH_3OH$ | 0.5 | Sty / VP / Isop | 3 / 3 / 14 | a 1.5 | 17 | 71 | 16.0 |
| 94 | $MgCl_2$[2] (1%) | 2.0 | $CH_3OH$ | 0.5 | Sty / VP / Isop | 3 / 3 / 14 | a 1.5 | 17 | 71 | 29.4 |
| 95 | HCl (36%)[b] | 0.25 | $CH_3OH$ | 2.5 | Sty / VP / Isop | 3 / 3 / 14 | a 1.5 | 17 | 71 | 21.2 |
| 96 | HCl (36%)[b] | 0.63 | $CH_3OH$ | 2.5 | Sty / VP / Isop | 3 / 3 / 14 | a 1.5 | 17 | 71 | 31.6 |

[1] In Table VII the monomers are identified as follows: Sty=styrene; Isop=isoprene; AN=acrylonitrile; VP=2-methyl-5-vinylpyridine; MAA=methacrylic acid.
[2] Based on anhydrous salt but using $MgCl_2 \cdot 6H_2O$.
a 10% $H_2O_2$.
b Forms the hydrochloric acid salt of 2 methyl-5-vinylpyridine.

The technique described for Table I was used here for the preparation of other polymers.

TABLE VIII

| Example | Activator | Amt., g. | Solvent[1] | Amt., g. | Monomer[1] | Amt., g. | 10% $H_2O_2$ | Time, hrs. | Temp., °C. | Percent conv. |
|---|---|---|---|---|---|---|---|---|---|---|
| 97 | None (control) | | $iC_3H_7OH$ | [2] 20 | Chloro | 100 | 20 | 3 | 50 | 8 |
| 98 | LiCl (2%) | 10 | $iC_3H_7OH$ | [2] 20 | do | 100 | 20 | 3 | 50 | 20 |
| 99 | None (control) | | THF | 11.5 | VCl | 20 | 1.5 | 16 | 25 | 0.2 |
| 100 | $NH_4SCN$ (1%) | 3 | THF | 8.5 | VCl | 20 | 1.5 | 16 | 25 | 10.4 |
| 101 | $NH_4SCN$ (1%) | 6 | THF | 5.5 | VCl | 20 | 1.5 | 16 | 25 | 22.7 |
| 102 | None (control) | | THF | 28.5 | VDCl | 20 | 1.5 | 18 | 50 | 0.3 |
| 103 | $NH_4SCN$ (1%) | 5 | THF | 23.5 | VDCl | 20 | 1.5 | 18 | 50 | 3.5 |
| 104 | None (control) | | THF | 5.5 | AN | 20 | 0.5 | 16 | 50 | 0 |
| 105 | LiCl (1%) | 2.0 | THF | 3.5 | AN | 20 | 0.5 | 16 | 50 | 51 |
| 106 | None (control) | | MEK | 9 | AN | 10 | 1.0 | 16 | 25 | 0 |
| 107 | $NH_4SCN$ (2%) | 7.5 | MEK | 1.5 | AN | 10 | 1.0 | 16 | 25 | 30 |
| 108 | KSCN (2%) | 4 | MEK | 5 | AN | 10 | 1.0 | 16 | 25 | 40 |
| 109 | None (control) | | DMSO | 24 | AN | 8 | 1.0 | 65 | 25 | 0 |
| 110 | $NH_4SCN$ (1%) | 10 | DMSO | 14 | AN | 8 | 1.0 | 65 | 25 | 95 |
| 111 | KSCN (1%) | 10 | DMSO | 5 | AN | 5 | 1.0 | 16 | 25 | 80 |
| 112 | None (control) | | Et Carb | 14 | AN | 5 | 1.0 | 65 | 25 | 0 |
| 113 | $NH_4SCN$ (1%) | 10 | Et Carb | 4 | AN | 5 | 1.0 | 2.5 | 25 | 26 |
| 114 | None (control) | | Pr Carb | 24 | AN | 8 | 1.0 | 65 | 25 | 0 |
| 115 | $NH_4SCN$ (1%) | 10 | Pr Carb | 14 | AN | 8 | 1.0 | 2.5 | 25 | 20 |
| 116 | $NH_4SCN$ (1%) | 10 | Pr Carb | 14 | AN | 8 | None | 65 | 25 | 0 |
| 117 | KSCN (1%) | 10 | Pr Carb | 14 | AN | 8 | 1.0 | 2 | 25 | 15 |
| 118 | None (control) | | DMF | 14 | AN | 5 | 1.0 | 16 | 25 | 0 |
| 119 | $NH_4SCN$ (2%) | 8 | DMF | 6 | AN | 5 | 1.0 | 16 | 25 | 26 |
| 120 | None (control) | | Pr Carb | 14 | $CH_3AN$ | 5 | 1.0 | 2 | 25 | 0 |
| 121 | KSCN (1%) | 10 | Pr Carb | 4 | $CH_3AN$ | 5 | 1.0 | 2 | 25 | 1.8 |

[1] In Table VIII the solvents and monomers are identified as follows: Chloro=chloroprene; THF=tetrahydrofuran; VCl=vinyl chloride; VDCl=vinylidene chloride; AN=acrylonitrile; MEK=methylethylketone; DMSO=dimethyl sulfoxide; Et Carb=ethylene carbonate; Pr Carb=propylene Carbonate; DMF=dimethyl formamide; $CH_3AN$=methacrylonitrile.
[2] Plus 200 grams toluene for Examples 97 and 98 only.

TABLE IX
Ingredients: Each charge contained 20 grams isoprene plus other ingredients as indicated

| Example | Activator | Amt., g. | Isopropanol, g. | Peroxide, g. | | Time, hrs- | Temp., °C. | Percent conv. | Residual peroxide percent |
|---|---|---|---|---|---|---|---|---|---|
| 122 | None (control) | | 6 | TBHP | 0 | 08 | 50 | 1.6 | 36 |
| 123 | LiCl (1%) | 1 | 5 | TBHP | 0 | 08 | 50 | 9.8 | 6.7 |
| 124 | LiCl (1%) | 2 | 4 | TBHP | 0 | 08 | 50 | 10.3 | |
| 125 | None (control) | | 6 | DIP | 0 | 08 | 50 | 5.5 | |
| 126 | LiCl (1%) | 1 | 5 | DIP | 0 | 08 | 50 | 8.1 | |
| 127 | LiCl (1%) | 2 | 4 | DIP | 0 | 08 | 50 | 8.8 | |
| 128 | None (control) | | 6 | PMHP | 0 | 08 | 50 | 4.2 | |
| 129 | LiCl (1%) | 1 | 5 | PMHP | 0 | 08 | 50 | 8.6 | |
| 130 | None (control) | | 8 | PMHP | 0.5 | 64 | 49 | .2 | |
| 131 | LPC (2%) | 5 | 3 | PMHP | 0.5 | 64 | 59 | 8.1 | |

In the foregoing examples, all parts are by weight unless otherwise indicated. Of the many activators used above, the most effective appear to be the inorganic salts including the chlorides of ammonia, magnesium, and lithium. Calcium nitrate and zinc chloride are also quite effective but should be used at a higher level. Many of the polymeric products produced in accordance with the present invention are useful in coating the inside of metal storage tanks by mixing the liquid polymer with a suitable polyisocyanate together with other materials to cause polymerization of the mixture into a high molecular weight, tough, solvent resistant coating. Each of the foregoing polymers are useful in the ways presently known for these polymers.

While certain representative embodiments and details have been shown for the purpose of illustrating the invention, it will be apparent to those skilled in this art that various changes and modifications may be made therein without departing from the spirit or scope of the invention.

What is claimed is:

1. In the process for the manufacture of a polymer selected from the group consisting of a low molecular weight diene polymer by the polymerization of a conjugated diene monomer, and a vinyl polymer by the polymerization of a vinyl monomer, the process being carried out in a mutual solvent polymerization system comprising the monomer to be polymerized, hydrogen peroxide and at least one non-aqueous solvent selected from the group consisting of alcohols, ketones, ethers, dimethylsulfoxide, ethylene carbonate, tetrahydrofuran, and dimethylformamide, in amounts from about 10 to about 400 parts of solvent per 100 parts of monomer wherein the mutual solvent system comprises a single liquid phase in which the reactants are dissolved, at a temperature from about 25° C. to about 100° C. at autogenous pressure, the improvement which comprises adding to the polymerization system from .001 to about 10 parts per 100 parts of monomer of an initiator activator which is soluble in the non-aqueous solvent by at least 2 percent at 25° C. and being selected from at least one of the group consisting of lithium chloride, lithium bromide, and an amine salt conforming to the following generalized structural formula

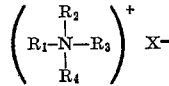

wherein N is a pentavalent nitrogen, X is a chloride or bromide anion, $R_1$, $R_2$, $R_3$ and $R_4$ are hydrogen, alkyl radicals (1–18C), cycloalkyl radicals (5–10C), aralkyl radicals (7–10C), and wherein $R_1$ and $R_2$ are alkylene radicals (4–9C) and are combined to form a heterocyclic ring with the nitrogen and wherein $R_1$, $R_2$ and $R_3$ are alkenylene radicals (5–10C) and are combined to form a heterocyclic aromatic ring with the nitrogen, the activator causing at least a two fold increase in the rate of polymer formation.

2. The process of claim 1 wherein the monomer is selected from the group consisting of butadiene, isoprene and chloroprene.

3. The process of claim 1 wherein the monomer is selected from the group consisting of acrylonitrile and vinyl chloride.

4. The process of claim 2 wherein the solvent is selected from the group consisting of methanol, ethanol, isopropanol, and β-(methoxy) ethanol.

5. The process of claim 3 wherein the solvent is selected from the group consisting of tetrahydrofuran, dimethylformamide, and dimethylsulfoxide.

6. The process of claim 1 wherein the activator is selected from the group consisting of ammonium chloride and tetramethyl ammonium chloride.

7. The process of claim 1 wherein the polymer is a rubbery copolymer of butadiene and styrene.

8. The process of claim 1 wherein the polymer is a rubbery copolymer of butadiene and acrylonitrile.

References Cited
UNITED STATES PATENTS

| | | | |
|---|---|---|---|
| 2,333,635 | 11/1943 | Britton et al. | 260—63 |
| 2,416,461 | 2/1947 | Stewart | 260—84.1 XR |
| 2,682,530 | 6/1954 | St. John | 260—94.4 XR |
| 3,214,419 | 10/1965 | Hodgdon | 260—94.2 XR |
| 3,312,679 | 4/1967 | Crano | 260—94.4 XR |
| 3,432,484 | 3/1969 | Welch | 260—94.2 XR |
| 3,427,366 | 2/1969 | Verdol et al. | 260—85.1 XR |
| 2,377,752 | 6/1945 | Britton et al. | 260—92.8 XR |

JOSEPH L. SCHOFER, Primary Examiner

W. F. HAMROCK, Assistant Examiner

U.S. Cl. X.R.

260—83.1, 83.7, 84.7, 88.2, 88.7, 89.5, 89.5, 92.3, 92.8, 93.5, 94.2